Aug. 18, 1925.

E. J. SOVATKIN

STETHOSCOPE

Filed July 10, 1923

1,550,287

INVENTOR.
Edward J. Sovatkin
BY
ATTORNEYS

Patented Aug. 18, 1925.

1,550,287

UNITED STATES PATENT OFFICE.

EDWARD J. SOVATKIN, OF BROOKLYN, NEW YORK.

STETHOSCOPE.

Application filed July 10, 1923. Serial No. 650,582.

*To all whom it may concern:*

Be it known that I, EDWARD J. SOVATKIN, a citizen of the United States, residing at Brooklyn, in the county of Kings and State of New York, have invented new and useful Improvements in Stethoscopes, of which the following is a specification.

This invention relates essentially to a stethoscope and particularly to the construction of the chest member which is adapted to be placed upon the chest for ascertaining the auscultations of the chest organs.

An object of the invention is to provide the chest member with a metal insert having a threaded nipple to obviate breakage.

Another object of the invention is to mold the hard rubber of the chest member about the head of the nipple so that it will practically unite with the metal and substantially become a single unit thus preventing it from pulling out or turning.

Another object of the invention is to provide a nipple which when molded with the hard rubber of the chest member is rigidly locked against longitudinal pull as well as axial strain, and it particularly prevents loosening of the nipple from the expansion and contraction of the rubber when the instrument is sterilized in hot liquid.

Heretofore the chest member was made entirely of hard rubber, but after it was in use for a while it would break at the threaded part of the nipple adjacent the head thereby rendering the chest piece useless.

The invention resides more particularly in the novel combinations hereinafter described and claimed reference being made to the accompanying drawing in which:—

Figure 1:
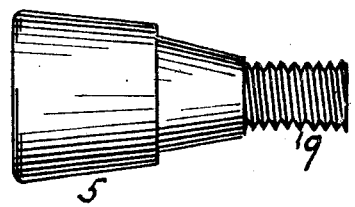
Fig. 1 represents a side elevation of a chest member embodying this invention.
Figure 2:
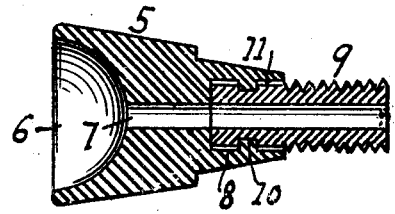
Fig. 2 is a vertical longitudinal section of the same.

In the drawing is shown a chest member consisting of a conical head 5 having a hemispherical hollow interior 6 and a bore 7 extending through the axis. The member is molded of hard rubber and it has a socket 8 the function of which will be hereinafter described.

Figure 3:
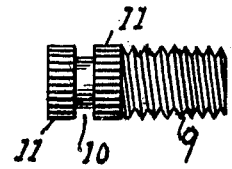
Fig. 3 is a side elevation of a nipple.

Projecting from the socket is a metal nipple having an exteriorly threaded stem 9 for connecting it to one end of a tube communicating with the ear pieces at the other end as is well known. The head of the stem is united with the socket and it includes an annular channel 10 to key it to the rubber. The surface of the head adjacent the channel is knurled or grooved as indicated at 11 in Fig. 3 to engage the rubber.

The rubber when plastic or molded flows into the interstices of the knurls or grooves and the channel thereby locking the two parts together and preventing the nipple from being pulled out or turning.

I claim:—

1. A stethoscope comprising a chest member having a socket, a nipple with a stem projecting from and a head molded in the socket, the head having an annular channel to key it against longitudinal movement, and longitudinal grooves to prevent axial movement.

2. A stethoscope comprising a hard rubber chest member having a socket, and an exteriorly threaded nipple projecting from the socket, said nipple having a head with an annular channel and longitudinal groove portions adjacent to the channel to prevent it from pulling out or turning in the socket.

In testimony whereof I have hereunto set my hand.

EDWARD J. SOVATKIN.